US006769442B2

(12) United States Patent
Johnson (10) Patent No.: US 6,769,442 B2
(45) Date of Patent: Aug. 3, 2004

(54) HUNTING BLIND WITH FLIP-UP HOOD

(76) Inventor: Robert E. Johnson, 800 W. Shiawassee St., Lansing, MI (US) 48915

( * ) Notice: Subject to any disclaimer, the term of this patent is extended or adjusted under 35 U.S.C. 154(b) by 96 days.

(21) Appl. No.: 09/996,506

(22) Filed: Nov. 28, 2001

(65) Prior Publication Data

US 2003/0098055 A1 May 29, 2003

(51) Int. Cl.$^7$ .............................................. E04H 15/36
(52) U.S. Cl. ............................ 135/96; 135/98; 135/901
(58) Field of Search ............................... 43/1; 135/901, 135/120.2, 124, 132, 136, 137, 16, 20.3, 96, 22; 49/122, 123; 297/184.1, 184.14, 184.15, 184.16, 184.17; 248/155.3, 188.5, 346.07, 188.7; 182/71, 230, 135, 107, 188, 116, 20

(56) References Cited

U.S. PATENT DOCUMENTS

| | | | | |
|---|---|---|---|---|
| 663,279 A | * | 12/1900 | Jones ......................... 135/130 |
| 2,992,503 A | | 7/1961 | Webb |
| 3,323,530 A | * | 6/1967 | Smith ......................... 135/157 |
| 3,513,605 A | | 5/1970 | Smith |
| 3,556,014 A | * | 1/1971 | Rudkin, Jr. .............. 104/173.2 |
| 3,622,201 A | | 11/1971 | Radig |
| 3,799,608 A | | 3/1974 | Smutny et al. |
| 3,838,838 A | * | 10/1974 | Seaman, Jr. ................ 248/537 |
| 3,848,352 A | | 11/1974 | Sayles |
| 3,859,485 A | * | 1/1975 | Blinkilde et al. ......... 200/85 A |
| 3,886,678 A | | 6/1975 | Caccamo |
| 3,902,264 A | | 9/1975 | Radig |
| 4,086,931 A | | 5/1978 | Hall |
| 4,106,145 A | * | 8/1978 | Gillen et al. ................ 114/351 |
| 4,110,941 A | | 9/1978 | Scott |
| 4,364,193 A | | 12/1982 | Visco |
| 4,449,542 A | | 5/1984 | McSwain et al. |
| 4,483,090 A | * | 11/1984 | Carper ........................... 43/1 |
| 4,683,672 A | | 8/1987 | Davis |
| 4,716,919 A | | 1/1988 | Griffin |
| 4,738,045 A | | 4/1988 | Cardozo |
| 4,751,936 A | | 6/1988 | Zibble et al. |
| 4,782,616 A | | 11/1988 | Hambleton |
| 4,788,997 A | * | 12/1988 | Clopton ...................... 135/117 |
| 4,798,019 A | | 1/1989 | Sury et al. |
| 4,813,442 A | * | 3/1989 | Haines ......................... 135/98 |
| 4,858,635 A | | 8/1989 | Eppenbach |
| 5,092,653 A | * | 3/1992 | Felling .................. 297/184.15 |
| 5,203,363 A | * | 4/1993 | Kidwell et al. ............... 135/90 |
| 5,339,847 A | * | 8/1994 | Kanter et al. ................. 135/16 |
| 5,369,816 A | * | 12/1994 | Chen ............................. 4/408 |
| 5,647,159 A | | 7/1997 | Latschaw |
| 5,842,741 A | * | 12/1998 | Onorini ...................... 297/281 |
| 5,906,217 A | | 5/1999 | Hill |
| 5,921,627 A | | 7/1999 | Risetter |
| 6,016,823 A | | 1/2000 | Hill |
| 6,129,101 A | * | 10/2000 | Dubinsky .................. 135/20.3 |
| 6,402,233 B1 | * | 6/2002 | Tseng ...................... 297/184.1 |

FOREIGN PATENT DOCUMENTS

FR 2577302 A1 * 8/1986 ........... B66C/23/80
IT 487193 * 11/1953

OTHER PUBLICATIONS

Web Document, Pop–Up Blinds, Jun. 1999, pp. 1 and 2.*

* cited by examiner

Primary Examiner—Janet M. Wilkens
(74) Attorney, Agent, or Firm—Price Heneveld Cooper DeWitt & Litton (57) ABSTRACT

An apparatus, useful as a hunting blind, includes a base, a seat operably mounted on the base, and a spring-biased camouflaged hood movably supported over the seat. A latch holds the hood down until a hunter sits on the seat, releasing the latch, but the hunter's weight then holds the hood down against the spring. The spring automatically moves the hood from a closed hiding position toward an open position when a hunter stands up, as the hunter removes his weight from the seat. The base is adapted with radially-extending feet for stability.

19 Claims, 8 Drawing Sheets

HUNTING BLIND WITH FLIP-UP HOOD

BACKGROUND

The present invention concerns portable outdoor enclosures, and more particularly relates to hunting blinds.

Duck and goose hunting require that a hunter be well-hidden until the game are within range of a good shot, and further require that the hunter be able to quickly stand up, aim and take his shot without visual or physical obstruction. Some duck and goose hunting blinds have been made with pop-open covers for this purpose. Some more advanced hunting blinds include a latch or other mechanism that the hunter must hit or release to cause the cover to open. For example, see U.S. Pat. Nos. 3,848,352, 3,622,201, and 3,848,352. A problem is that, when a hunter is focusing on his incoming prey, any distraction or secondary motion such as to release a latch or to push on a hood is distracting, and takes away from the hunter's focus. Further, any latch (or release mechanism) that requires a hunter to touch it necessarily forces the hunter to take his hand off of his gun, focus on and touch the latch to release it, and then re-grip his gun. This takes away from the hunter's timing and concentration, resulting in poor aiming and inconsistent shooting. It is very important that the cover, once released, move out of the way of a clear gunshot with substantial speed, so that the game does not have time to react and change direction before the hunter can shoot. Still further, hunters often have strong preferences and desires concerning what their hunting blind looks like and the options that it has. At a minimum, most hunters desire their hunting blinds to be portable, durable, collapsible for compact carriage, comfortable for use during several hours at a time, and adaptable to different land and weather conditions. Further, given the competitive market for such products, hunters desire hunting blinds that are well-camouflaged, light-weight, fast-acting, cost-effective, flexible in use, adaptable for different hunting conditions and hunter preferences, that are available with options permitting use on dry, muddy, or marshy areas, and that are easy to assemble and disassemble without losing pieces or losing significant hunting time.

Accordingly, an apparatus is desired solving the aforementioned problems and having the aforementioned advantages.

SUMMARY OF THE PRESENT INVENTION

In one aspect of the present invention, a covered apparatus includes a body-supporting member defining a seating area, and a hood operably supported over the seating area for movement between a hiding position where the hood is located over and hides the seating area and an open position where the hood is moved to uncover the seating area. A link-and-bias mechanism is operably connected to the hood to automatically move the hood toward the open position when a hunter removes his weight from the seat.

In another aspect of the present invention, a blind includes a base, an upright tubular frame supported on the base, and a seat supported on the base and the upright tubular frame. A hood is supported on the upright frame over the seat for movement between a hiding position where the hood is located over the seat and an open position where the hood is not located over the seat. A latch is attached to the upright tubular frame proximate the seat, and a cable that extends at least in part through the tubular frame to connect the hood to the latch.

In another aspect of the present invention, a blind includes a base with struts and a Z-shaped frame supported on the base. The frame has a vertical bottom post, a vertical top post, and an offset section connecting the top and bottom posts, with one of the top post, the bottom post, and the offset section including a releasable latch. A hood is operably connected to and supported for movement on the top post. A seat is supported in a balanced position over the vertical bottom post and includes a front section supported by the struts and a rear section supported by the base and connected to the releasable latch.

In still another aspect of the present invention, a blind includes a base, and a hood operably supported by the base for movement between a hiding position over the base and an uncovered position revealing the base. The base includes a plurality of horizontally-oriented radially-extending tubes with square cross sections. A plurality of elongated rods are provided with mating cross sections shaped to telescope into the tubes, with the rods having an outer end configured to stably engage a ground surface when the rods are telescoped into the tubes.

These and other aspects, objects, and features of the present invention will be understood and appreciated by those skilled in the art upon studying the following specification, claims, and appended drawings.

BRIEF DESCRIPTION OF DRAWINGS

FIGS. 5–7 are enlarged side views of the latch shown in FIGS. 1, 3 and 4; FIG. 5 showing the latch hooked to hold the hood in the closed position like in FIG. 1; FIG. 6 showing the latch released due to a hunter sitting on the seat but the hood is held down by the hunter's weight like in FIG. 3; and FIG. 7 showing the latch released and the hood raised as the hunter stands up like in FIG. 4;

DETAILED DESCRIPTION OF PREFERRED EMBODIMENTS

Figure 3:
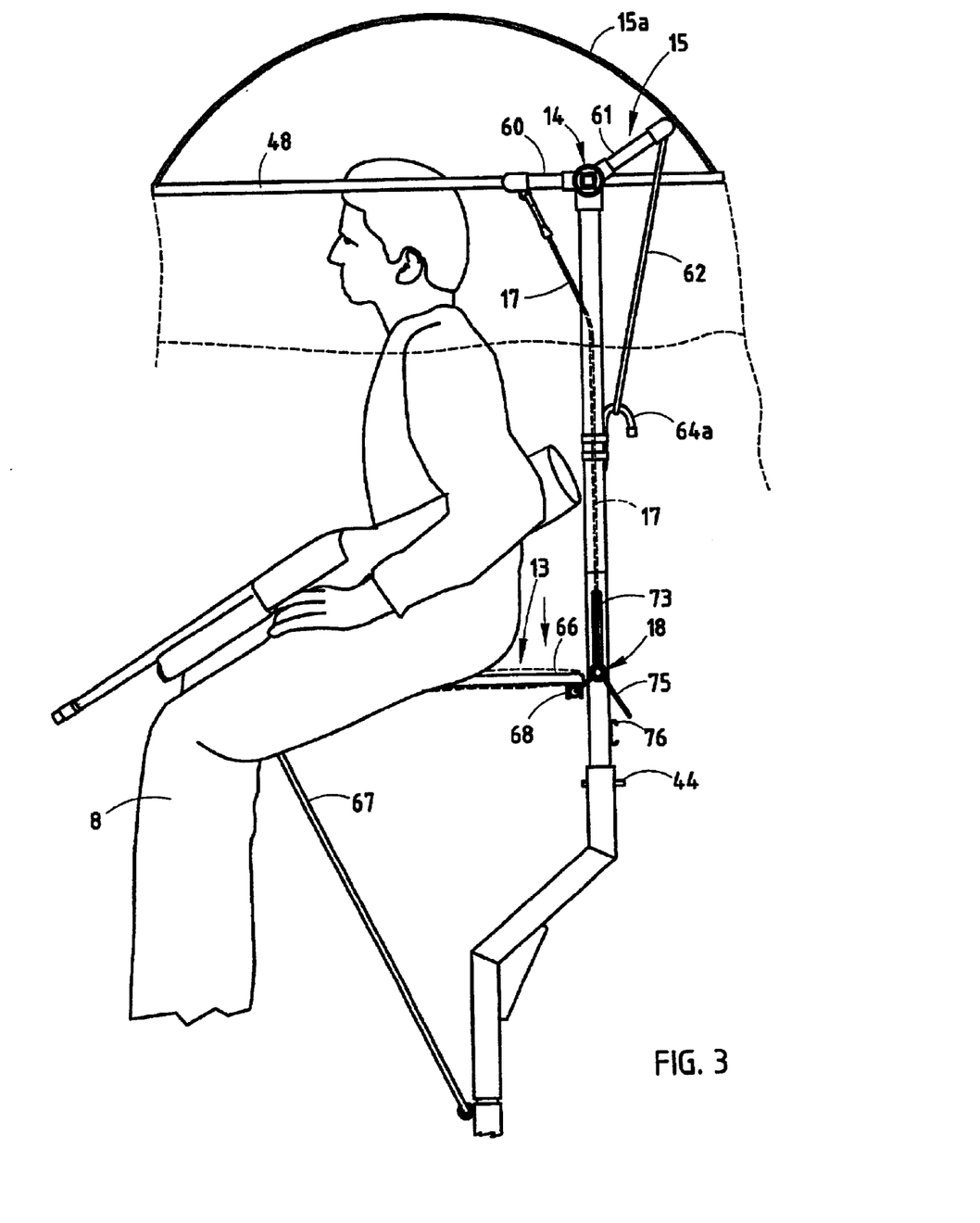
FIG. 3 is a side view of the apparatus of FIG. 1, showing the hood in a hiding position, with a hunter sitting down but ready to take aim.
Figure 4:
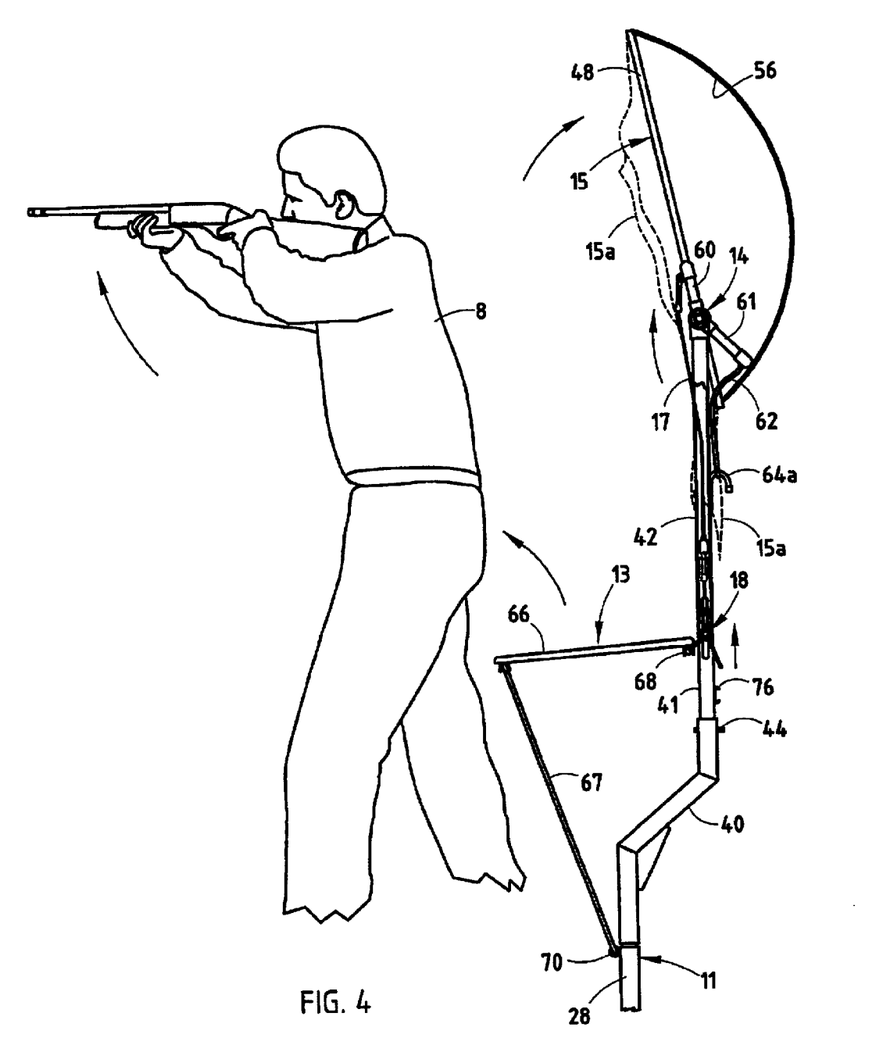
FIG. 4 is a side view of the apparatus of FIG. 1, showing the hood in an open position, with the hunter standing and taking aim.
Figure 4A:
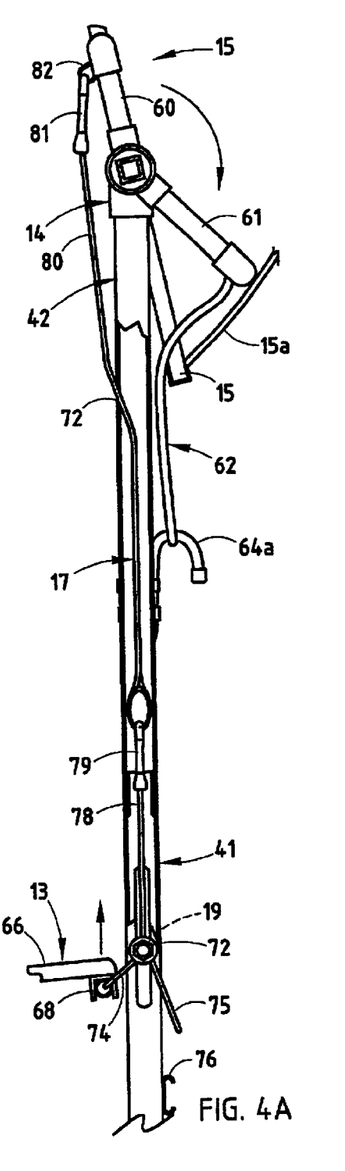

The present hunting blind apparatus 10 (FIG. 1) is particularly suited for duck and goose hunting, but it is also noted that it can be adapted for a variety of uses due to its flexibility and adaptability, as discussed below. The apparatus 10 (FIG. 2) includes a base 11, a Z-shaped tubular upright frame 12, a body-supporting member or seat 13, a top frame 14 and a hood frame 15 pivoted to the top frame 14. Hood material, such as camouflage material 15A or the like, covers the hood frame 15. A spring 62 (FIG. 3) is connected between a rear of the hood frame 15 and a lower portion of the top frame 14, and a cable 17 is connected between a front of the hood frame 15 and a slidable bearing latch 18 is mounted to a lower portion of the top frame 14 and is operably connected between the bearing 19 and a rear of the seat 13 by a trigger 75. The seat 13 is pivotally supported in front by a brace 67 that extends from the base 11. Initially, a hunter hooks trigger 75 to latch the hood 15/15A in a closed position. (See FIGS. 1, 1A, and 5.) When a hunter 8 sits on the seat 13 (FIGS. 3 and 6), the latch 18 is released, but the weight of the hunter overcomes a force of the spring 62 and keeps the hood frame 15 from being pulled open. When ducks fly over, the hunter stands up (FIGS. 4, 4A, and 7), causing the spring 62 to pull and pivot the hood frame rearwardly, resulting in the hood flying open rearwardly for an unobstructed gunshot.

Figures 9, 10:
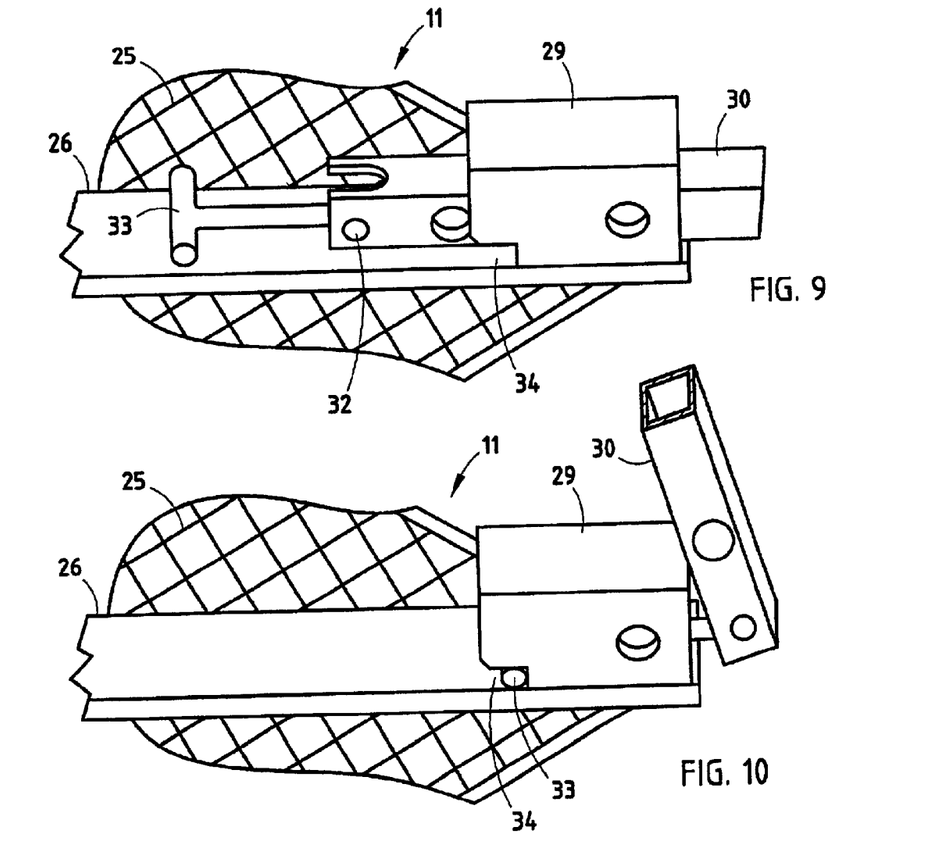
FIGS. 9–10 are perspective views of one of the stabilizing legs, FIG. 9 being in a radially-extending use position, and FIG. 10 being in an upwardly-folded storage position.

The base 11 (FIG. 2) includes a main plate 25, a plurality of radially-extending leg support brackets 26, a reinforcing plate 27, and a vertical pipe section 28, all attached rigidly together in a sandwich-like arrangement. A receiving tube 29 defining a square cross section is attached to an outer end of each of the leg support plates 26, for telescopingly receiving the rods 30. The rods 30 (FIG. 9) can be solid or tubular. The rods 30 have a square cross section that prevents them from rotating within the receiving tubes 29. Attached to an end of each rod 30 is an anchor having one end 32 pivoted to the rod 30, and a trailing end 33 that is T-shaped. The receiving tube 29 includes slots 34 shaped to receive and capture the T-shaped trailing end 33 when the rod 30 is telescoped out of the receiving tube 29, such that the rod 30 always is retained to the base 11. When telescoped fully outwardly, the rods 30 are positioned out of and released from the receiving tube 29, such that the rods 30 can be pivoted upwardly to a raised storage position (FIG. 10). When the rods 30 are fully telescoped into the receiving tube 29 and engaged with the ground, the illustrated anchor is not needed and lies on the support brackets 26. However, it is contemplated that a spring could be attached to the anchors (such as to the pipe section 28) for biasing the rods 30 inwardly, or the anchor could be made to pivot upwardly to lock onto a catch (such as to a latch on an inner end of the receiving tube 29), if a more positive retaining system were desired.

Figure 11:
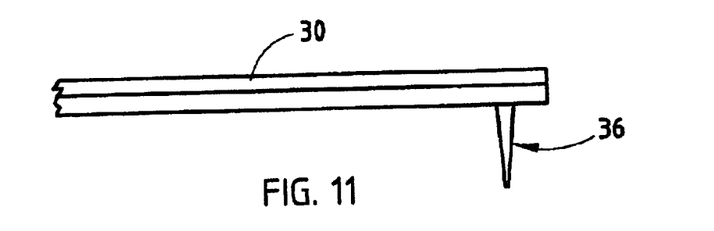
FIGS. 11–13 are perspective views of legs having different ground-engaging feet.
Figure 12:
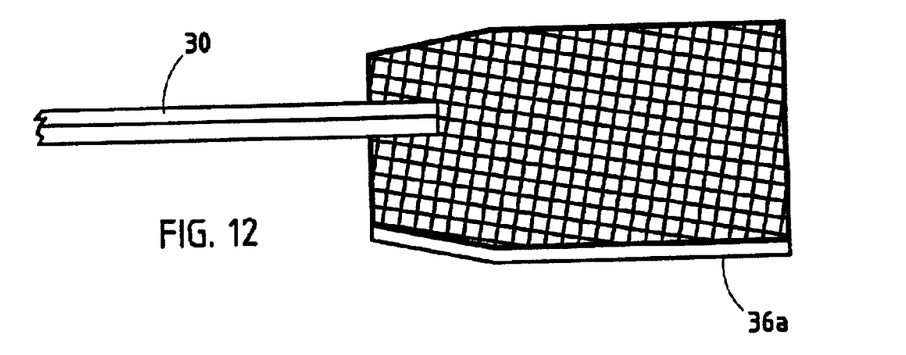
Figure 13:
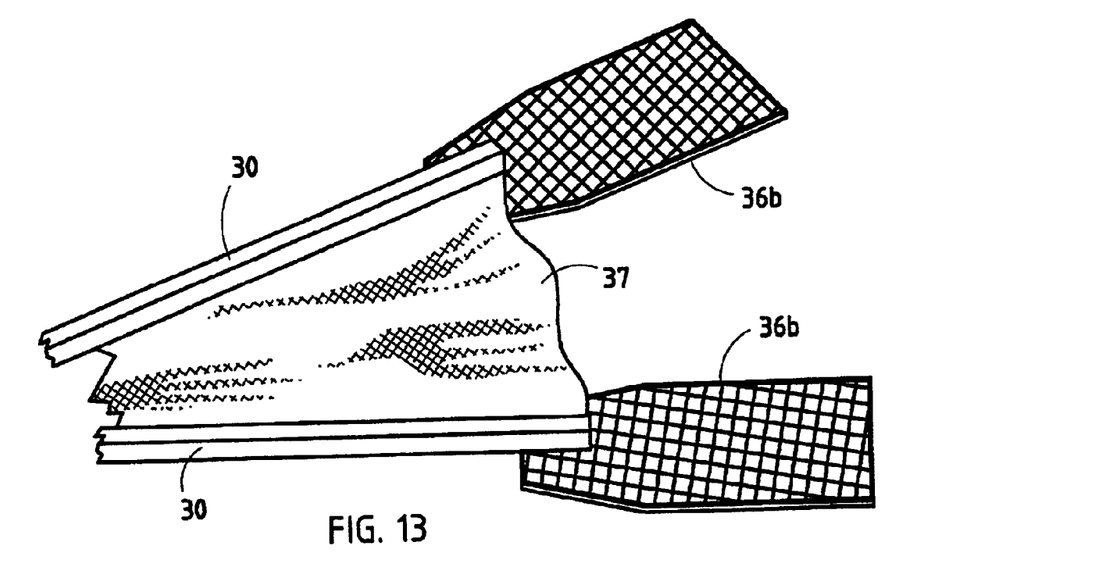

Different legs can be attached to the base 11. The illustrated legs include a foot 36, 36A, 36B attached to the rods 30. If the anchors are made removable, such as by threading the trailing end 33 into the other end 32 or into the rod 30, different feet can be attached to the base 11 by removing rods 30 with one foot and replacing them with a rod 30 having a different foot. Alternative, the feet can be made removable from the rods 30. FIGS. 11–13 illustrate three different leg arrangements. Foot 36 (FIG. 11) comprises a downwardly-extending spike for engaging soft ground such as dirt in a cornfield. Foot 36A (FIG. 12) includes a panel-shaped member that can be used for soft, marshy areas where a large footprint is desired, or can be used on hard surfaces where penetration of the ground is not possible. Also, the foot 36A can be made of a rigid foam or the like to provide some buoyancy. Foot 36B (FIG. 13) is similar to foot 36, but includes a webbing 37 that extends between the rods 30, for providing increased surface area.

The Z-shaped tubular frame 12 (FIG. 2) includes a bottom frame section 40, two mid-frame sections 41 and 42 that telescope together to form a rigid upright frame assembly. The bottom frame section 40 also telescopes mateably onto the pipe section 28 of base 11, and the upper mid-frame section 42 telescopes mateably into a nipple 43 extending down from the top frame 14. All of these telescoping connections are secured together by a locking device, such as a locking pin 44 that engages aligned holes in frame sections, or such as a spring-biased pin located within the frame sections (not specifically shown) that engages aligned holes.

Figure 8:
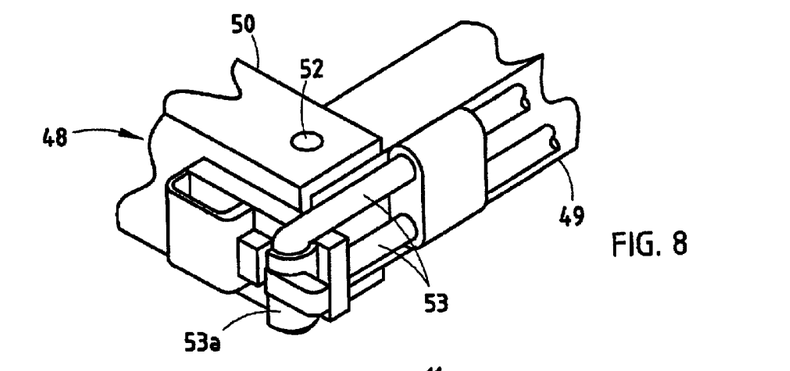
FIG. 8 is a perspective view of the circled area VIII in FIG. 1, the FIG. 8 showing a corner of the hood frame with a releasable connection permitting disassembly.

The top frame 14 (FIG. 2) includes the down nipple 43 and further includes a horizontal tube bearing section 46 forming a bearing that extends laterally to rotatably support the hood frame 15. The hood frame 15 includes a horizontal rotatable pipe section 47 that extends through and rotatably engages the horizontal tube section 46. The hood frame 15 further includes a light-weight canopy frame including a perimeter loop 48 with side sections 49 fixed to ends of the rotatable pipe section 47 and front and rear sections 50 and 51 fixed to ends of the side sections 49. If a hunter desires to disassemble the canopy frame for a very compact storage, the ends of the hood frame sections 49–51 can be made to releasably dovetail together and be securely attached by a pin 52 or by a resilient band of bungee cord 53 that engages a hooked tab 53A (or both) (FIG. 8). Leaf-spring-like arches 54–56 (FIG. 2) are formed by thin steel bands of material and include ends slipped into slots in the front and rear sections 50 and 51. In the illustrated arrangement, the side sections 49 are pivoted to ends of the rotatable pipe section 47 by hinges 49A so that the parts remain connected together, yet so that they can be folded together in a compact arrangement.

A fabric hood covering or canopy material 15A rests on the canopy frame 48–51/54–56 and is made of camouflage-colored sheet material. Notably, the sheet material can be any type, any color, and any pattern desired, depending on the intended use and area of use. Preferably, for hunting, the camouflage material is very lightweight and includes slits that provide small openings that can be seen through by the hunter, but that make it difficult for game to see through from a distance. For example, it works well to have camouflage material with random slits and oblong apertures cut into the material, where such apertures are about ¼" wide and 1" long, with the cutout material still attached to one end of the opening, where the apertures are randomly spaced apart about every inch or two. Some camouflage materials are loosely knit or so thin that they permit some vision through the material itself. The canopy material 58 includes a concave top portion 59 that is supported on the arches 54–56, and side flap portions 59A that hang down from the side sections 49, and front and rear flap portions 59B that hang down from the front and rear sections 50 and 51.

A front arm 60 and a rear arm 61 extend from and are secured to the rotatable pipe section 47. The illustrated arms 60 and 61 are C-shaped so that they extend around and do not interfere with the bearing section 46, and so that they extend a significant distance from the bearing section 46 at their mid-points to create torque arms as discussed below. The mid-point of the rear arm 61 is connected to a linear spring, such as a bungee cord 62 to create the bias on the rear arm 61 needed to open the hood 15/15A. Specifically, the bungee cord 62 includes hooks 63 for releasable attachment to the rear arm 61, with a center elastic section 64 of the cord 62 hooked around an anchoring finger 64A on the upper mid-frame section 42. The length of arm 61 and strength of the bungee cord 62 allows the cord 62 to generate significant torque, such that the hood frame 15 (and material 15A) flips open rapidly, such as in about a half of a second. By providing two bungee cords of different strengths (see the second bungee cord 62A), the hunter has a choice of using either one or both, such that three different hood opening speeds can be achieved.

The seat 13 (FIG. 2) includes a seat panel 66, a front brace 67 pivoted to a front of the seat panel 66, and a channel 68 attached to a rear of the seat panel 66. The seat panel 66 can be cushioned or covered, if desired. The front brace 67 includes a bottom section 69 that extends horizontally through and pivotally engages a bearing tube 70 welded to the pipe section 28.

The slidable bearing 19 (FIG. 5) includes a linear bearing or bolt 72 that slides vertically along slots 73 in the mid-frame section 41. A loop 74 extends forwardly and downwardly from the bearing 72 and engages the channel 68. The loop 74 can be made releasable to facilitate disassembly and compact storage. By disconnecting the loop 74, a rear of the seat 13 can be pivoted to a compact storage position near the pipe section 28 of the base 11.

Figures 5, 6, 7:
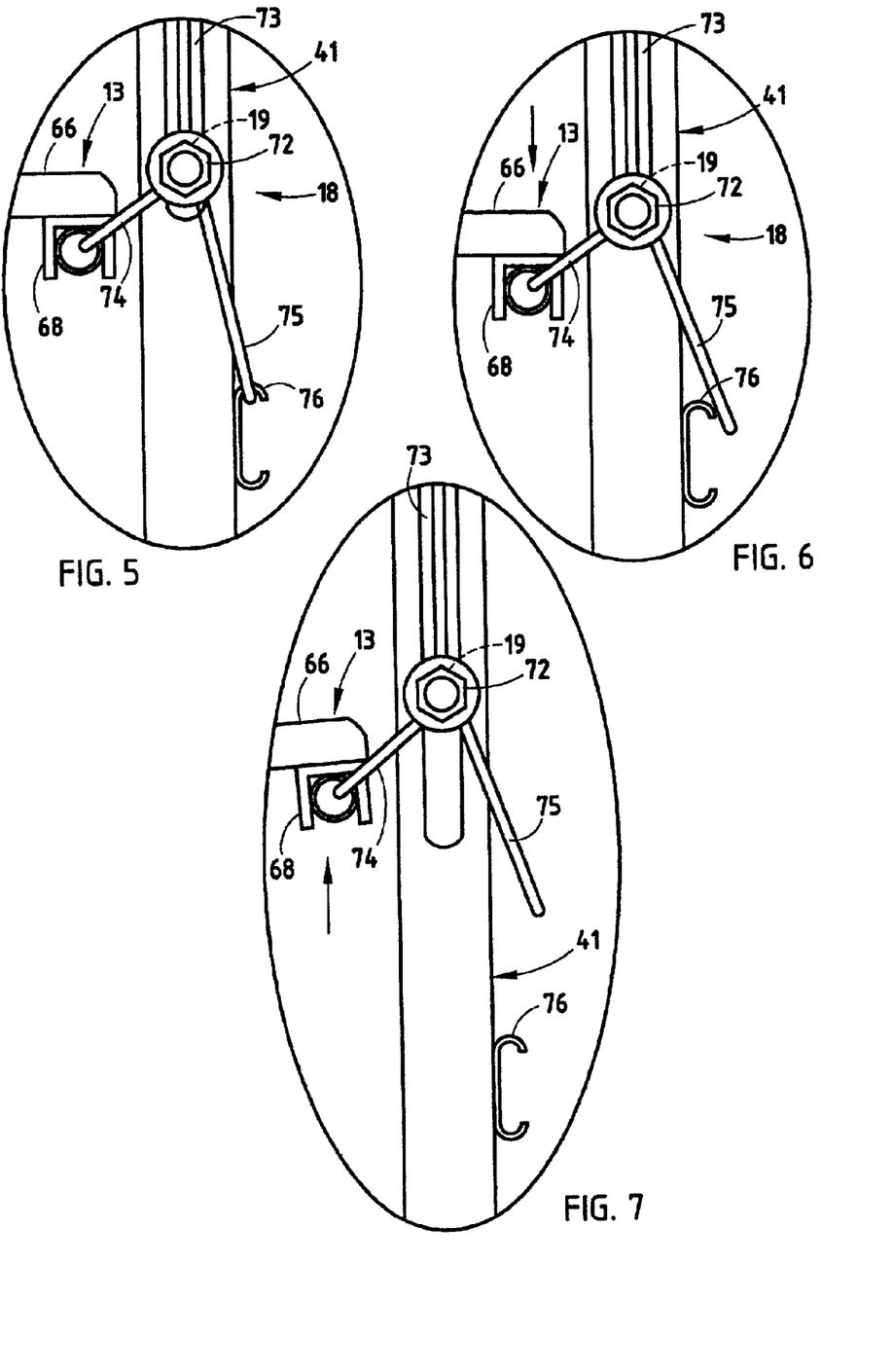

The latch 18 includes a U-shaped actuator or release member 75 (FIGS. 5–7) in the form of a loop that extends for releasable engagement with a lower hook 76 on the lower mid-frame 41. The release member 75 has a length chosen so that the release member 75 can be hooked onto the lower hook 76 when there is no weight on the seat 13 (i.e. when the hunter is not sitting on the seat 13) (FIG. 5). However, the release member 75 is biased outwardly so that, when the hunter sits down on the seat 13 and the release member 75 moves downwardly a short distance, the release member 75 springs outwardly rearwardly far enough to clear the hook 76 (FIG. 6). Thus, when a hunter stands up (FIG. 7), the release member 75 clears the hook and permits the bungee cords 62 to snap open the hood 15/15A.

The cable 17 (FIG. 1A) is attached to the linear bearing 72 and extends upwardly inside the tubular frame sections 40–42 to a location 77 on upper mid-frame section 42 where the cable 17 extends out through a front window. The cable 17 extends to and is connected to the front arm 60. The illustrated cable 17 is comprised of two sections that snap-attach together, such that they can be disconnected when the apparatus is being disassembled for compact storage. Specifically, the cable 17 includes a bottom section 78 with a top snap 79 that engages a loop on a top cable 80, and the top cable 80 includes a top snap 81 for attachment to a bracket 82 on the arm 60. It is contemplated that a cable section could be made for each frame section 40–42 to facilitate assembly and disassembly, if desired.

Figure 1:
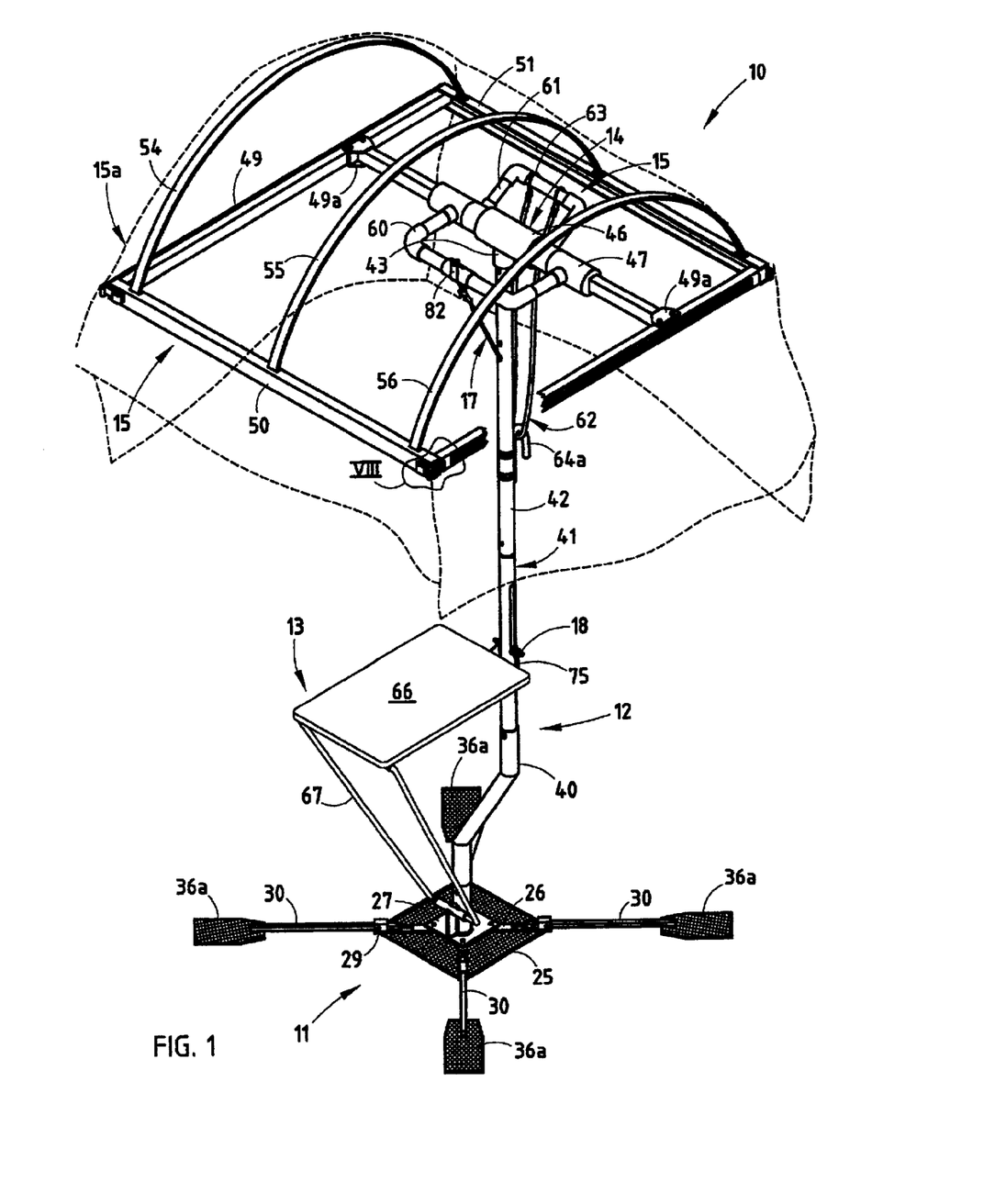
FIG. 1 is a perspective view of the hunting blind apparatus.
Figure 1A:
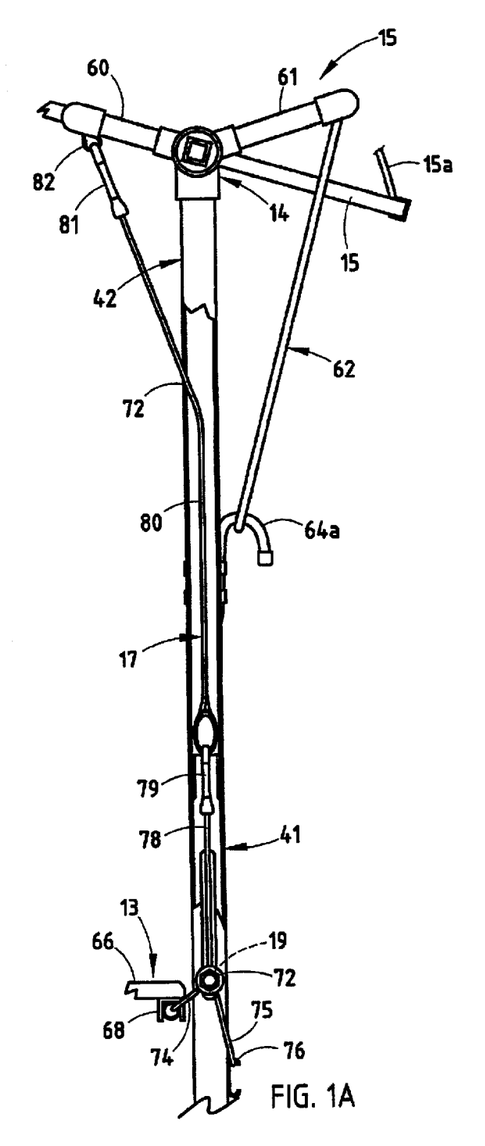
FIGS. 1A and 4A are enlarged views of the framework shown in FIGS. 1 and 4, the framework being broken away to show internal structure, FIG. 1A showing the hood in the hiding position like FIG. 1, and FIG. 4A showing the hood in the open position like FIG. 4.
Figure 2:
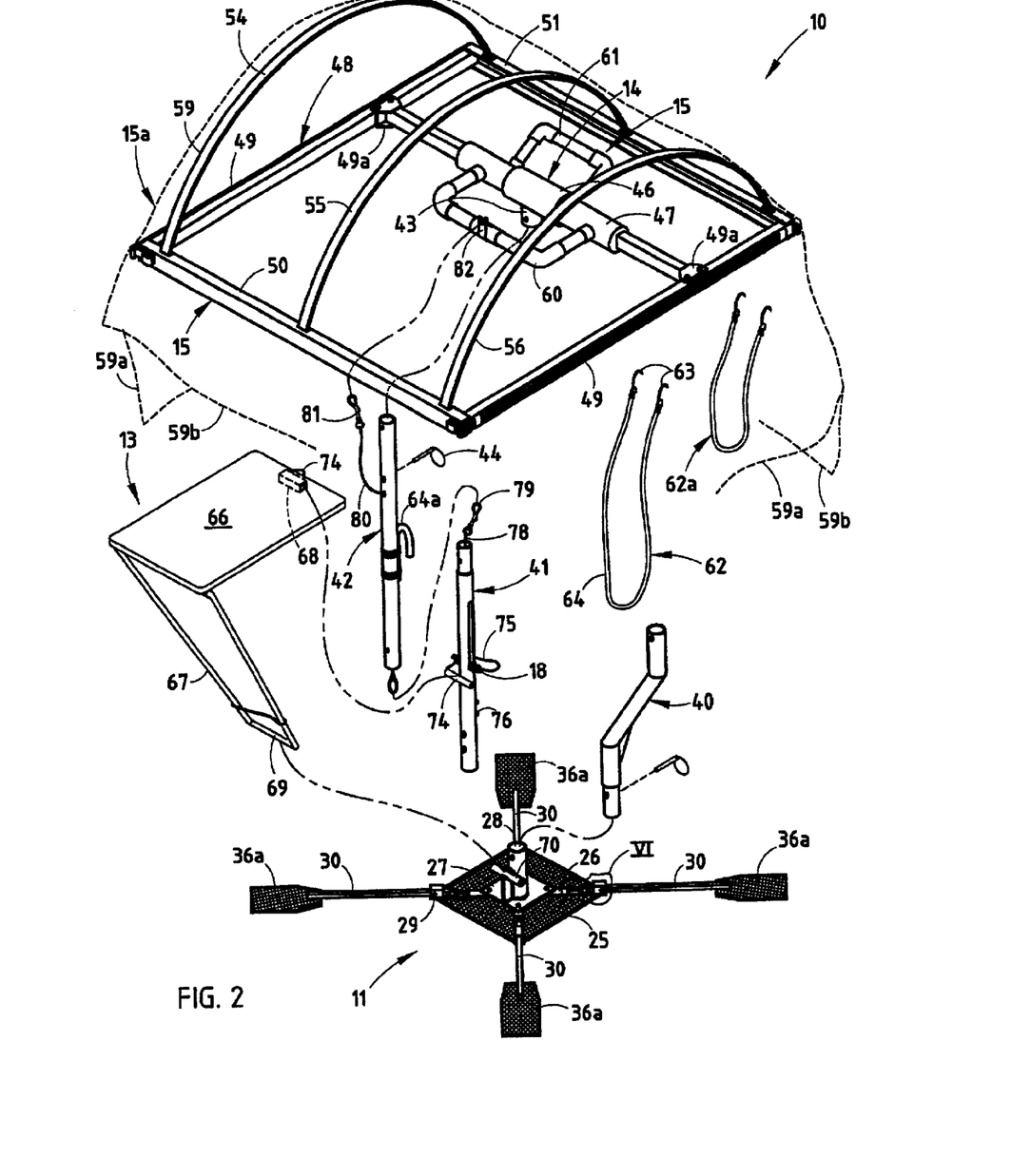
FIG. 2 is an exploded perspective view of FIG. 1.

In operation, a hunter assembles the apparatus 10 as shown in FIGS. 1 and 2, including latching the release member 75 to the hook 76. This holds the seat 13 in a latched position. When the hunter sits on the seat 13 (FIG. 6), the latch 18 is released (FIG. 7), but the weight of the hunter overcomes a force of the spring 62 and keeps the hood frame 15 from being pulled open. The hunter is able to look around and through the covering material and see game coming. At a chosen time, the hunter stands up, taking his weight off the seat, which causes the spring 62 to automatically flip open the hood 15/15A.

The present apparatus is contemplated to be very flexible, and several variations are contemplated. For example, the base 11, seat 13, and remaining components can be modified to form a lean-to arrangement, where a hunter sits on the ground and rests with his/her back and/or buttocks against the body-supporting member 13. In such case, the hunter would sit up when ready to shoot. Also, it is contemplated that the body-supporting member could be configured to support an arm or other body part. In another variation, the hood 15/15A and frame 14 is modified to simulate an outdoor structure, such as a tree stump, a manhole cover, a patch of cattails or grass, a shock of cornstalks, a pile of straw, or the like.

Notably, the present apparatus 10 is usable for things other than for hunting. For example, the present apparatus is excellent for outdoor photography or for other activities where a quick-opening hood is useful when one's hands are occupied with other things.

The present apparatus 10 can be disassembled and broken down to different stages, with each stage offering a more and more compact package for carrying. In the most disassembled stage, the rods 30 are pivoted upwardly to form a tent-like arrangement with the base forming a bottom of the "tent" and the rods 30 forming angled sides. The seat 13 and frame components 40–42 and the top frame 14 and components of the hood frame 15/15A can be extended vertically within the "tent", and the bungee cords 62 can be wrapped around the "tent" to form a compact unit that is easily carried.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A covered apparatus comprising:
   a body-supporting member defining a seating area;
   a hood operably supported over the seating area moveable between a hiding position where the hood is located over and hides the seating area and an open position where the hood is moved to uncover the seating area;
   a framework operably supporting the body-supporting member and the hood;
   a link-and-bias mechanism operably connected to the hood and the body-supporting member to automatically move the hood toward the open position when a person removes their weight from the body-supporting member, and
   a latch on the framework operably connected to the link-and-bias mechanism and to the body-supporting member, the latch being movable between a latched position where the latch secures the body-supporting member in a secured position against a force of the link-and-bias mechanism until the person places a portion of the person's body weight on the body-supporting member, and being configured to automatically move to a released position when the person places the portion of their body weight on the body-supporting member.

2. The apparatus defined in claim 1, wherein the body-supporting member comprises a seat.

3. The apparatus defined in claim 1, wherein the hood includes a flexible covering that is camouflaged and made of material suited for outdoor use.

4. The apparatus defined in claim 1, including a base supporting the framework, the base including radially extending legs configured to stably support the body-supporting member and hood in a freestanding manner.

5. The apparatus defined in claim 1, wherein the link-and-bias mechanism includes a link mechanism connecting the body-supporting member to the hood.

6. The apparatus defined in claim 5, wherein the body-supporting member comprises a seat configured and adapted to support a person's body weight.

7. The apparatus defined in claim 6, wherein the link mechanism is connected to a rear of the seat.

8. The apparatus defined in claim 5, wherein the framework includes tubular members defining an internal cavity and wherein the link mechanism includes a movable component located within the cavity of the framework.

9. The apparatus defined in claim 8, wherein the link mechanism includes a cable with a first end extending out of the internal cavity and operably connected to the body-supporting member, and with a second end extending out of the internal cavity and operably connected to the hood.

10. The apparatus defined in claim 1, including a spring attached to the hood and biasing the hood toward the uncovered position.

11. The apparatus defined in claim 10, wherein the spring comprises an elastic cord.

12. The apparatus defined in claim 10, including a second spring that can be selectively used individually or in combination with the first-mentioned spring.

13. The apparatus defined in claim 1, including a base supporting the body-supporting member and hood in a self-supporting upright manner, the base, hood, and body-supporting member being configured to fold into a compact portable package for easy carriage.

14. The apparatus defined in claim 12, wherein the base includes a plurality of horizontally-oriented radially-extending tubes and includes a plurality of elongated rods shaped to telescope into the tubes, the rods each having an outer end configured to stably engage a ground surface when the rods are telescoped into the tubes, and having an inner end with a retainer thereon shaped to retain the rods to the tubes when the rods are telescoped out of the tubes but further permitting the rods to pivot to a vertical position against the base for compact storage.

15. A blind comprising:

a base;

an upright tubular frame supported on the base;

a seat supported on the base and the upright tubular frame;

a hood supported on the upright frame over the seat and that is movable between a hiding position where the hood is located over the seat and an open position where the hood is not located over the seat;

a latch attached to the upright tubular frame proximate the seat and operably connected to the seat moveable between a latched position that holds the hood in the hiding position when a person is not resting on the seat, and a released position when the person is resting on the seat, the latch further being configured to stay in the released position when the person stands up from the seat and until the latch is reset; and a cable that extends at least in part through the tubular frame and that operably connects the hood to the latch.

16. The blind defined in claim 15, including a biasing spring attached to the hood and biasing the hood toward the open position.

17. The blind defined in claim 16, including a second biasing spring, the first-mentioned spring and the second spring being individually releasably attached so that the first-mentioned and second springs can be used singularly or together to bias the hood open at a selected speed.

18. A blind comprising:

a base including struts;

a frame supported on the base and having a vertical bottom post, a vertical top post, and an offset section connecting the top and bottom posts;

a link-and-bias mechanism on the frame including a link mechanism and a releasable latch supported by the frame and movable between a holding position and a released position;

a hood operably connected to and supported on the top post the hood moveable for movement between a hiding position and an open position; and a seat supported in a balanced position over the vertical bottom post and including a front section pivotally supported by the struts and a rear section operably supported by the base and connected to the link mechanism and the releasable latch, the seat being movable between a lowered position where the link mechanism and latch hold the hood in the hiding position and a raised position where the hood link mechanism and latch are released for movement of the hood to the open position;

the latch when in the holding position holding the seat in the lowered position, and the latch when in the released position releasing the seat for movement from the lowered position, but the seat being configured and arranged to hold the hood in the hiding position when the hunter is resting on the seat even when the latch is in the released position.

19. A covered apparatus comprising:

a seat defining a seating area and movable between a first position and a second position with respect to a framework;

a hood operably supported on the framework, and over the seating area moveable between a hiding position where the hood is located over and hides the seating area and an open position where the hood is moved to uncover the seating area; and a link-and-bias mechanism operably connecting the seat to the hood so that the first position of the seat corresponds to the hiding position of the hood, and so that the second position of the seat corresponds to the open position of the hood, the link-and-bias mechanism providing a biasing force to automatically move the hood toward the open position when a hunter removes his weight from the seat; and a releasable latch on the framework operably connected to the link-and-bias mechanism configure when latched to secure the seat in the first position against the biasing force of the link-and-bias mechanism even when the hunter is not placing a portion of the person's body weight on the seat.

* * * * *

UNITED STATES PATENT AND TRADEMARK OFFICE
CERTIFICATE OF CORRECTION

PATENT NO. : 6,769,442 B2
DATED : August 3, 2004
INVENTOR(S) : Robert E. Johnson It is certified that error appears in the above-identified patent and that said Letters Patent is hereby corrected as shown below:

Column 7,
Line 25, "claim 12" should be -- claim 13 --;

Column 8,
Line 15, after "post", insert -- , (comma) --;
Line 24, after "hood", insert -- , (comma) --.

Signed and Sealed this

Fourth Day of January, 2005

JON W. DUDAS
*Director of the United States Patent and Trademark Office*